June 7, 1955

A. H. HANSON 2,710,106

HAND TRUCK

Filed Sept. 5, 1952

INVENTOR.
ALFRED H. HANSON
BY Mock & Blum
ATTORNEYS

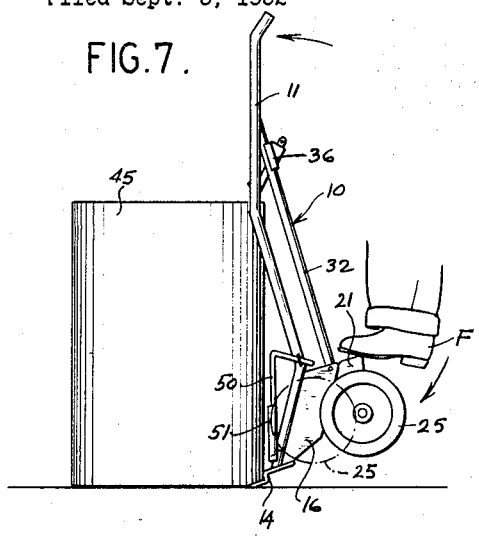
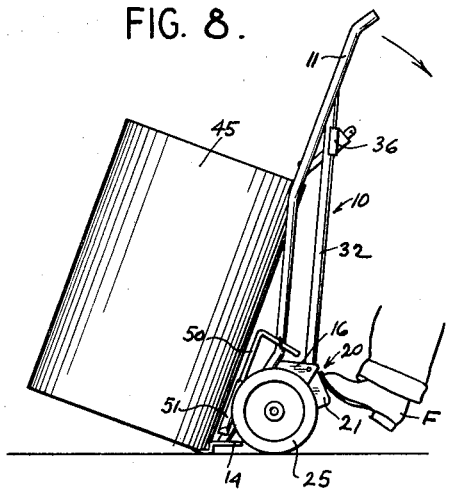
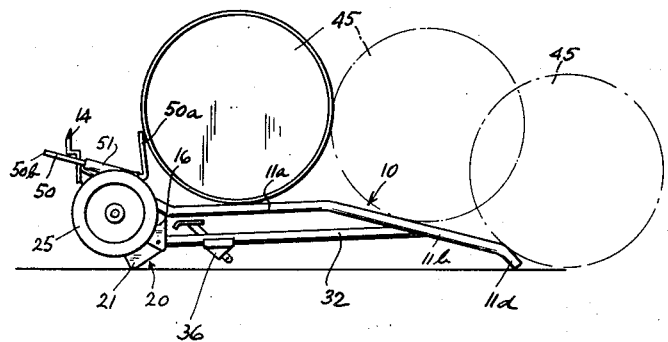
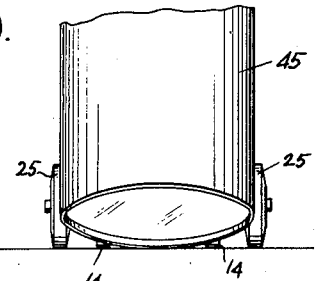
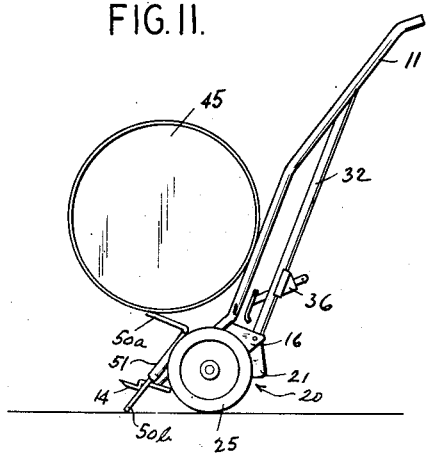
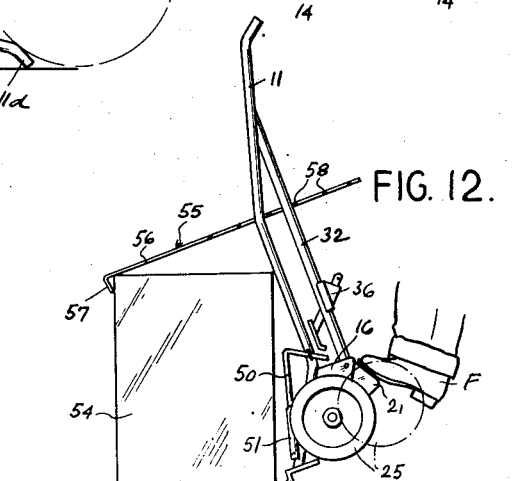

United States Patent Office 2,710,106
Patented June 7, 1955

2,710,106

HAND TRUCK

Alfred H. Hanson, Garrison, N. Y., assignor to The Fairbanks Company, New York, N. Y., a corporation of New Jersey Application September 5, 1952, Serial No. 308,119

11 Claims. (Cl. 214—383)

My invention relates to improvements in hand trucks, and in particular to a barrel truck of the type used for manually transporting large barrels or drums.

It is an object of the invention to provide a hand truck of the type described which is constructed to produce improved leverage in operation, sufficient to enable a large and heavy object to be easily and efficiently tilted from an upright position to an inclined position in which it rests upon the hand truck for transporting.

Another object of the invention is the provision of a hand truck of universal application which may be used to carry all types of barrels, drums, or other cylindrical objects, as well as large boxes, crates, bales and objects of generally rectangular shape.

Another object of the invention is the provision of a hand truck of the type described which is also adapted to readily receive a horizontally-disposed heavy cylinder as a barrel, drum or paper roll, and to transport the cylinder while the latter remains in a horizontal position.

A further object of the invention is the provision of a hand truck of the type described which has a pivotable wheel assembly adapted to be moved forward into contact with the truck frame with sufficient impact to forcibly drive the base spurs of the truck under the load to be lifted and carried.

A further object of the invention is the provision of a hand truck of the type described in which the pivotable wheel assembly may be brought close to the truck body during the transporting operation or may be extended in spaced relation to the truck body to provide a base support whereby the truck may be stored in an upright position when not in use.

A further object of the invention is the provision of a hand truck of the character described in which improved load-holding means are provided to eliminate many of the dangers normally inherent in careless or unskillful handling of a truck of this type.

Other objects and advantages of the invention will be apparent in the course of the following specification when taken in connection with the accompanying drawings, in which:

Fig. 7 is a side elevation showing the first step in the loading of a drum from an upright position onto the hand truck;

Fig. 8 is a similar view showing a subsequent step in the loading operation;

Fig. 9 is a partial front elevation of the barrel and hand truck in their positions of Fig. 8;

Fig. 10 is a side elevation showing the manner in which a cylindrical drum is loaded on the hand truck from a horizontally-disposed position;

Fig. 11 is a side elevation showing the manner in which a drum is transported horizontally upon the hand truck; and Fig. 12 is a side elevation showing the use of the hand truck in loading a large square object.

The hand truck 10 illustrated is of the general type of barrel truck and is particularly suited to receive and transport large, heavy cylindrical objects such as filled drums, barrels, paper rolls, or the like. The truck has a frame which includes a pair of spaced, longitudinally-disposed frame bars 11 and 12 and a cross bar 13 connecting said frame bars adjacent their upper ends. The frame bars 11 and 12 and the cross bar 13 may be made in hollow tubular form, for example from one inch iron pipe.

Figure 1:
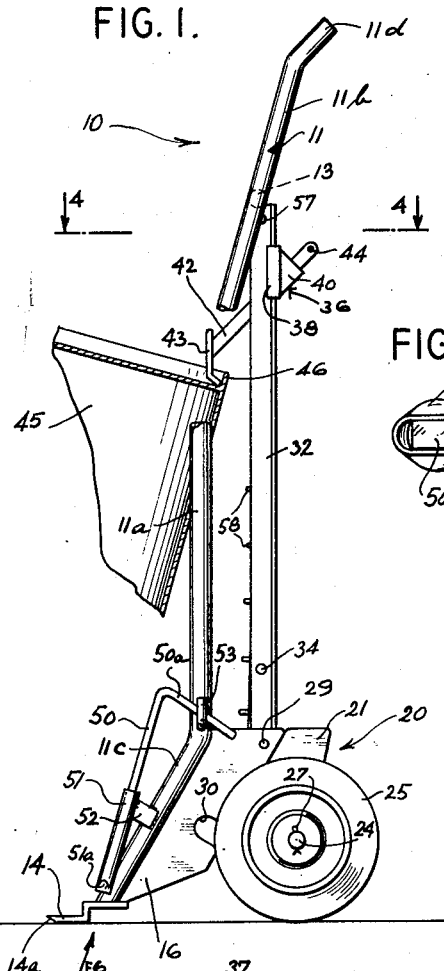
Fig. 1 is a side elevation of a hand truck made according to the invention showing the manner in which it holds a drum; the drum being shown in section and broken away, and a portion of the hand truck being broken away.
Figure 2:
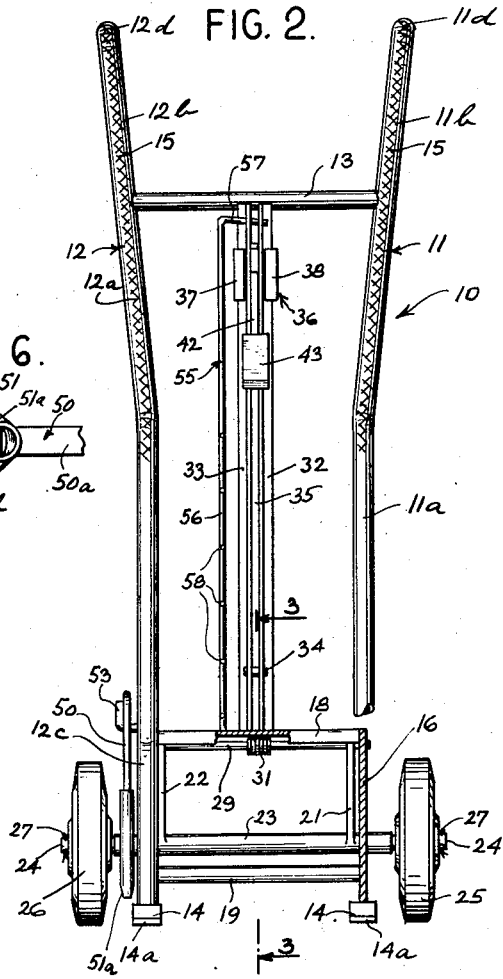
Fig. 2 is a front elevation of the hand truck with portions of the frame broken away to reveal internal structure.
Figure 4:
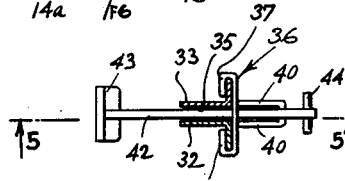
Fig. 4 is a section taken along line 4—4 of Fig. 1.

The frame bars 11 and 12 have respective planar central portions 11a and 12a which are disposed substantially vertically when the hand truck is in an upright position, as shown in Fig. 1. The respective upper portions 11b and 12b of the frame bars are bent to provide a slight rearward inclination as can be seen in the side view of Fig. 1, and may also be bent to incline laterally away from each other, as shown in Fig. 2. The respective lower frame bar portions 11c and 12c are inclined forwardly relative to the central portions 11a and 12a, and each lower portion 11c and 12c carries an identical fixed spur 14 at its bottom end. Each said spur 14 is in the stepped shape shown clearly in Figs. 1–3, and has a forwardly-directed horizontal lower leg which has a flat bottom surface, the forward portion 14a of which inclines upwardly to provide a relatively sharp leading terminal edge.

The rearwardly inclined upper frame bar portions 11a and 12a serve as handles during use of the hand truck and are preferably serrated or knurled on their outer surfaces as indicated at 15 in Figs. 1 and 2, to afford a secure hand-grip and for a further purpose which will be presently described. To provide a more convenient hand-grip, the top ends 11d and 12d of the upper frame bar portions may optionally be bent at a greater angle rearwardly.

The lower frame bar portions 11c and 12c have respective rigid, rearwardly-extending extension plates 16 and 17 which are preferably integral therewith and are parallel to each other. Said extension plates 16 and 17 are connected at their top ends by a channel iron 18 of the cross-sectional shape shown in Fig. 3, and at their lower ends by a cross-bar 19.

The conventional barrel truck has a pair of wheels mounted on a fixed part of the frame. In contrast, I provide a wheel assembly 20 which is pivotally mounted on the frame for movement relative thereto during operation. The wheel assembly 20 has a pair of spaced wheel plates 21 and 22 whose bottom ends are connected by an integral tubular sleeve 23. A wheel axle 24 extends through sleeve 23 and carries wheels 25 and 26 which are rotatably mounted on the ends thereof. The wheels 25 and 26 are held against the ends of the sleeve 23 by cotter pins 27 or other suitable means to restrain lateral movement of the wheels. The wheel plates 21 and 22 are of inverted triangular shape and are connected at their top ends by a channel iron 28.

Figure 3:
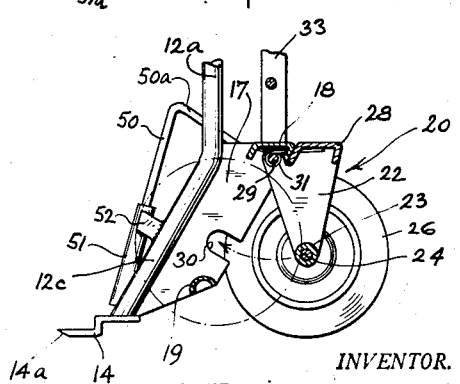
Fig. 3 is a section taken along line 3—3 of Fig. 2.

A pivot rod 29 is rigidly mounted between the upper rear corners of the spaced frame extension plates 16 and 17, as shown in Figs. 1 and 3. The upper forward corner of each wheel plate 21, 22 is turnably mounted on said pivot rod 29, so that the wheel assembly 20 is pivotable between an extended position shown in Fig. 1 and a retracted position shown in Fig. 8 and in phantom in Fig. 3. When the wheel assembly 20 is brought to its extended position, the adjacent depending legs of the channel irons 18 and 28 abut each other to act as stop means for preventing further outward pivoting of the wheel assembly. In the retracted position of the wheel assembly 20, the axle sleeve 23 enters respective alined slots 30 in the rear edge of the extension plates 16 and 17, which slots 30 enable the wheels 25, 26 to be brought up close to the spurs 14, the slots 30 carrying the entire weight of the load being transported.

A torsion spring 31 whose central coils encircle the pivot rod 29, has terminal arms which respectively abut the inner surfaces of the channel irons 18 and 28, as shown in Fig. 3, in such a manner that the spring normally urges the wheel assembly 20 to its extended position of Fig. 1 in which the wheels 25 and 26 are spaced well rearwardly of the spurs 14, and in which the wheel centers are located rearwardly of the pivot rod 29. In this position the hand truck is self-supporting in an upright position, resting solidly on a base formed by the bottom edge of the spurs 14 and the wheels 25, 26. The hand-truck may thus be left in an upright position when not in use. The spring 31 serves only to hold the wheel centers rearwardly beyond the normal center of gravity so that the wheel assembly 20 locks in position to support the entire unit vertically. The spring 31 may be of any suitable tension and is not essential for operation of the wheel assembly.

The hand truck frame also includes a pair of central longitudinally-extending, parallel angle irons 32, 33 which connect the cross bar 13 with the channel iron 18. The angle irons 32, 33 are spaced from each other along their lengths to define a central slot 35 therebetween. The angle irons 32, 33 carry a chime hook assembly which is mounted for free vertical and longitudinal sliding movement thereon. Said chime hook assembly comprises a channel-shaped slide bracket 36 having a pair of opposed bent ends 37, 38 which embrace the outer laterally-extending edges of the angle irons 32, 33. The bracket 36 has at its lower end a slot 39 which registers with the slot 35 between the angle irons 32, 33. Secured to the rear wall of bracket 36 is a wedge-shaped extension having spaced, triangular side walls 40 connected by a bottom wall 41 which is inclined at an angle of approximately 45° to the longitudinal axis of the angle irons 32, 33.

An elongated shank 42 of a chime hook 43 extends through the slots 35 and 39 and is freely slidable therein. Said shank 42 is guided by the extension side walls 40 and bottom wall 41, being held by the latter at an angle of approximately 30° to the axis of angle irons 32, 33. Shank 42 has a terminal cross pin 44 which prevents the shank from sliding out of contact with the rear extension of bracket 36.

The shank 42 may thus be slid diagonally through the alined slots 35, 39 to move the chime hook 43 toward or away from the angle irons 32, 33. This feature of infinitely-variable adjustability permits all types of barrels and drums to be pulled and held tightly against the hand truck frame regardless of the variation in thickness of the drum flange or rim, or variation in head diameter of the drum or barrel. To allow for these dimensional variations, it has been the usual practice to provide in hand trucks of this type at least two fixed chime hook lips for engaging drum rims. Such fixed positions, however, would still allow as much as two to three inches of back lash to occur in certain instances when the truck was moved from its transporting to its unloading position, which would often cause the drum to lurch forward and gain sufficient momentum to forcibly wrest the handles from the operator's grasp. In addition, the same lack of close contact could cause the drum being transported to rotate and roll sideways off the frame, especially if one of the spurs failed to insert properly beneath the drum as sometimes occurs when the floor surface is uneven. The present chime hook construction insures that the load is held close to the hand truck frame by an automatic tightening operation which will be presently described.

In use, the weight of the load holds the chime hook assembly in adjusted position, as will be presently explained. When the assembly is not in use, the bracket 36 is free to slide downwardly on the angle irons 32, 33 to the position shown in Figs. 11 and 12, the spacer pin 34, in this instance, acting as a stop to limit this downward sliding movement.

The conventional use of hand trucks of this type is in the lifting and transporting of heavy barrels, drums, and other cylindrical containers which are originally in a vertically upright position. Figs. 7, 8 and 9 show the loading operation of the hand truck of the instant invention when an upright drum 45 is to be transported. As shown in Fig. 1, the top of barrel 45 has an upstanding peripheral flange 46.

Fig. 7 shows the first step in the aforementioned loading operation, in which the hand truck 10 is wheeled into close proximity to the drum 45 and is then tilted forwardly as shown until the upper frame portions 11b and 12b abut the top of the drum. The chime hook assembly is lifted to the top of the angle irons 32, 33 and allowed to drop until the chime hook 43 abuts the top of the drum 45.

The weight of the slide bracket 36 then causes it to continue to drop on the angle irons 32 and 33 which in turn causes the shank 42 to be drawn inwardly through the slot 39 moving the chime hook 43 toward the edge of the drum until its bent end contacts the drum flange 46, as shown in Fig. 1. The bent end of the chime hook 43 in sliding over the smooth upper surface of the drum head, offers little resistance to this automatic action. In any event, a slight jarring of the angle irons 32, 33 against the rim of drum 45 brings about the desired action, or, at the option of the operator, bar 42 may be manually moved rearwardly until the chime hook is in its holding position.

With the top of drum 46 engaged by the chime hook 43, the handle portions 11d and 12d of the hand truck frame are grasped by the operator who also places his foot F upon the top channel iron 18 of wheel assembly 20, as shown in Fig. 7. Downward pressure on the foot F will cause the bottom of the hand truck to move forwardly so that the spurs 14 slide upon the ground surface until they straddle the lower outer periphery of the drum 45. In this position, the spurs 14 are resting on the upwardly inclined bottom surface portions 14a, and the hand truck is in position to tilt the drum 45. It will be noted that the wheel assembly is urged to its extended position by tension of the spring 31. If a spring is not used, the wheels 25, 26 will hang vertically and will still be spaced from the extension plates 16, 17.

To tilt the drum 45, the operator pulls rearwardly on the handle portions 11d and 12d, while at the same time he places his full weight upon his foot F. The wheel assembly 20 is thereupon pivoted forwardly to the broken-line position shown in Fig. 7, against the tension of spring 31. The hand truck, at the same time, pivots rearwardly on the spurs 14, the latter turning from their inclined positions of Fig. 7, to the position of Fig. 8 at which their planar bottom surfaces are resting flush upon the ground surface.

Drums or barrels of the size of the drum 45 may weigh, when filled, between 450 and 750 pounds. The leverage applied to the hand truck 10 by the combined rearward pull on the handle portions 11d and 12d and the foot pressure on the wheel assembly, is fully sufficient to tilt a drum of this weight easily and efficiently. Such leverage is augmented by the construction of the spurs 14 which places the pivoting fulcrum as close as possible to the center of gravity of the hand truck 10 and attached drum 45, and maintains it there. This is a decided advantage over conventional barrel trucks which have arcuate radius spurs curving rearwardly toward the wheels and causing the pivoting fulcrum to move progressively away from the center of gravity when the drum or barrel is tilted, and thus requiring greater effort on the part of the operator.

Downward pressure on the foot F, besides providing a great leverage advantage, also pivots the wheel assembly 20 forwardly to its retracted position, at which time the axle 24 enters the slots 30 and strikes the extension plates 16 and 17. This striking produces an impact which aids in the rearward tilting of the hand truck and also pushes the spurs 14 in firm engagement with the bottom of drum 45.

When the wheel assembly 20 is in its forward or retracted position, the wheels 25, 26 are located close to the spurs 14. When the hand truck 10 reaches the position of Fig. 8, the wheels abut the ground surface. By this time, the center of gravity of the unit has shifted rearwardly so that it is located behind the spurs 14 and approximately in line with the wheel bearings. The hand truck may then be easily tilted further rearwardly to a transporting position about the axis of the wheel bearings, the spurs 14 rising clear of the ground surface. Since the wheels 25, 26 in their retracted position are located close to the spurs 14, the tilting fulcrum of the truck is shifted from the spurs to the wheels quickly and before considerable effort is required on the part of the operator.

It will be noted that the distance between the spurs 14 is considerably less than the diameter of the drum 45. As the drum 45 is tipped rearwardly, the angle formed between it and the ground surface becomes greater than the angle between the spurs 14 and the ground surface, with the result that in the position of Fig. 8, the spurs are located below the bottom surface of the drum 45 on either side of the point of peripheral contact of the drum and the ground surface and inwardly of the outer side peripheral edges of the drum. This relationship is clearly shown in Fig. 9. When the hand truck 10 is tilted rearwardly to a position in which the spurs 14 are raised from the ground surface, the spurs 14 thus also raise the drum 45 above the ground surface and act as a base to support the drum.

Figure 5:
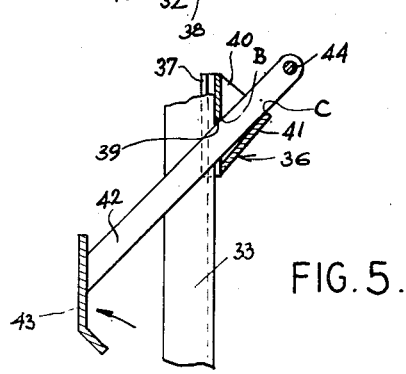
Fig. 5 is a section taken along line 5—5 of Fig. 4.

It will be further noted that as the operator begins to tilt the hand truck 10 rearwardly from its position of Fig. 7, the chime hook 43 in engagement with the drum flange 46 exerts a rearward force on the drum 45 which in effect produces a counter-thrust of the drum upon the chime hook 43 in the direction of the arrow in Fig. 5. This counter-thrust being forwardly and upwardly, tends to cause the chime hook shank 42 to pivot in a counter-clockwise direction. Such pivoting tendency is, however, retarded by the engagement of the shank 42 with the rear wall edge of slide bracket 36 at point B in Fig. 5, and with the upper surface of the bracket extension wall 41 at point C. This engagement effectively locks the shank 42 from movement through bracket 36. The thrust by the drum 45 continues throughout the tilting of hand truck 10, and the greater the thrust produced, the more firmly the shank 42 becomes locked in bracket 36.

As was previously indicated, conventional barrel trucks are adapted to load and transport heavy cylindrical objects only when the latter are in an upright position. The hand truck 10 of the present invention is, however, also adapted to receive and transport a barrel, drum, or the like in a horizontal position. This is particularly desirable since drums are generally unloaded from trucks or other carriers in a horizontal position and it has heretofore been necessary to tilt the drum to a vertical upright position for loading on a hand truck. It is physically impossible for an average strong man to lift by himself a filled 55 gallon drum or barrel from a horizontal to a vertical position, although he is capable of rolling the drum along horizontally.

Figure 6:
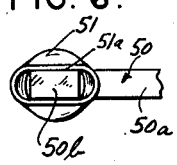
Fig. 6 is a bottom view of an auxiliary member of the truck as viewed in the direction of the arrow F6 in Fig. 1.

Fig. 10 shows the manner of loading a horizontally disposed drum upon the hand truck while Fig. 11 shows the manner in which the drum is held on the truck while being transported. To enable the drum to be held thereon, the hand truck 10 is provided with a pair of stakes 50, each held within a respective sleeve 51 which are respectively secured to the lower frame bar portions 11c and 12c, as by arms 52. As shown in Fig. 6, each sleeve 51 is generally cylindrical, but is flattened at its lower end to provide a substantially elliptical bottom opening 51a.

Each of the stakes 50 is made of a length of metal rod of rectangular cross section, bent at its upper end to form a lateral arm 50a. Each lateral arm 50a is normally held by a clip 53 secured to the respective frame bar 11, 12, with the lateral arm 50a facing rearwardly toward the hand truck body. In this position the major rectangular axis is alined with the major axis of the elliptical bottom opening 51a of sleeve 51, so that the stake 50 can slide through said opening 51a.

In the loading of a horizontally-disposed drum, the hand truck 10 is set horizontally upon the ground surface as shown in Fig. 10, so that it rests upon the ends of the handle portions 11d and 12d and also upon the projecting corner of the wheel assembly plates 21, 22. The weight of the truck upon this corner of the wheel assembly plates biases the wheel assembly 20 to retracted position, so that the wheels 25, 26 are raised from the ground surface. In this horizontal position of the hand truck 10, the central frame bar portions 11a, 12a are substantially parallel to the ground surface, while the upper frame bar portions 11b, 12b are inclined upwardly toward said central portions, providing a ramp up which the drum 45 may be rolled. Before the drum is thus loaded, each of the stakes 50 is lifted from its clip 53, turned 180° until the lateral arm 50a is facing forwardly, and slid downwardly through the sleeve 51 until the lateral arm 50a abuts the top of sleeve 51. The elliptical sleeve opening 51a serves to prevent the stake 50 from rotating from its operative position in which the lateral arm 50a is upstanding in the horizontal position of the hand truck.

The operator then rolls the drum 45 to the position shown in the right-hand broken-line representation in Fig. 10 and grasps the drum by its top and bottom flanges below center. A lift causes the drum 45 to begin rolling up the upper frame bar portions 11b and 12b, and good leverage is provided due to the large diameter of the drum. The operator stands in front of the drum between the laterally-diverging frame bar portions 11b, 12b, and holds his leg against the drum as a stop to hold the drum immovable while he shifts his hold upon the drum flanges. No danger exists in this use of the operator's leg since the slope angle of frame bar portions 11b, 12b is sufficiently low to prevent excessive pressure of the drum against the leg. The knurled or serrated top surface 15 of the frame bar portions 11b and 12c prevents the drum from slipping as it is rotated up the incline provided.

Rolling of the drum 45 continues until it comes into abutment with the upwardly-projecting stake arms 50a. In this position, shown in full line in Fig. 10, the drum 45 is stopped on the frame bar portions 11a and 12a well to the rear of the wheels 25, 26. By raising the handles 11d, 12d, the operator may shift the weight of the load from the wheel assembly plates 21, 22 to the wheels 25, 26, and the hand truck may then be tilted to the proper transporting position.

The stakes 50 provide safety means whereby the weight of the horizontal barrel is always distributed behind the wheels 25, 26. If the weight of the load were to shift beyond this point the operator would lose leverage and control of the hand truck. This could result in the drum 45 rolling over the stake arms 50a and dropping heavily upon the raised spurs 14, causing the entire hand truck frame to snap upright with sufficient force to seriously injure the operator. The projecting ends of the stakes 50 eliminate this hazard, however, by coming into contact with the ground surface when the hand truck 10 is still inclined rearwardly, as shown in Fig. 11, and preventing further forward tilting before the hand truck can approach a dangerous angle. If the drum 45 did roll over the stake arms 50a in this position, the ends of stakes 50 would still prevent the hand truck from flipping forwardly out of control.

In addition to its use in transporting drums and other cylindrical objects, the hand truck 10 is also capable of lifting and transporting large, heavy, square or rectangular objects such as packing cases, etc. This feature is accomplished by the particular design of the hand truck 10 and by utilization of the pivotable wheel assembly.

Fig. 12 shows the manner of loading a rectangular box 54 upon the hand truck 10. For this purpose, the truck is provided with a box hook 55 which comprises a rod 56 made of a length of round stock and bent at its end to form a hook 57. Intermediate its ends, the rod 56 has a plurality of spaced transverse cross pins 58. As shown in Fig. 2, the box hook 55 is normally carried in an inoperative position in alinement with and proximate to the angle irons 32, 33, the hooked end 57 extending through suitable holes in said angle irons. For use, the box hook 55 is removed from this inoperative position and inserted through the central slot 35 between angle irons 32, 33 with the cross pins 58 in axial alinement with said slots 35. When an adjusted position is determined, this box hook 55 is turned so that its hook end 57 is depending and the pins 58 are disposed perpendicular to the longitudinal axis of said slot 35. Since the pins 58 are each longer than the width of slot 35, the end of one of the pins will abut the rear surface of the angle irons 32, 33 so that the box hook is maintained at or close to its adjusted position, being held therein by the weight of the box to be lifted.

For tilting a heavy crate or box 54 onto the hand truck 10, the latter is wheeled to the box and tilted to the position of Fig. 12, which is similar to the initial position of the truck in Fig. 1, except that the spurs 14 are positioned against the rear bottom edge of the box 54, and not in a straddling position as in the case of a barrel lifting operation. The spurs 14 must now be wedged forcibly beneath the box, and for this purpose, sharp downward pressure is applied on the foot F causing the wheel assembly 20 to pivot rapidly inwardly and strike the frame extension plates 21 and 22. The impact provided by the heavy wheels 25, 26, each of which may weigh approximately 20 pounds, wedges the spurs 14 beneath the rear bottom surface of the box 54. If a single downward application of force on the wheel assembly 20 is not sufficient to achieve this result, the spring 31 is allowed to urge the wheel assembly back to its extended position and the impact process is repeated. The box hook 55 is now adjusted, as previously described, with the hook end 57 in engagement with a corner of box 54. By applying rearward force upon the frame handles and downward force on the wheel assembly, the hand truck 10 and box 54 may now be tilted rearwardly. The spurs 14, in tilting rearwardly from their positions of Fig. 12 in which they rest upon their inclined forward portions 14a, create a fulcrum at the immediate edge of the load so that a box weighing 600–700 pounds is tipped with ease. When the center of gravity is exceeded, (before the wheels 25, 26 come into ground surface contact), the box 54 actually helps itself off the ground and onto the wheels with a minimum of operation effort.

The impact function of the wheel assembly 20, together with the spur construction, and box hook feature, working in combination, enables one man to safely handle heavy loads in a manner never before considered possible.

While a preferred embodiment of the invention has been shown and described herein, it is obvious that numerous additions, changes, and omissions may be made in the invention without departing from the spirit and scope thereof.

I claim:

1. A hand truck comprising a body frame adapted to stand in an upright position upon a ground surface and having a forwardly-inclined lower body portion carrying a fixed forwardly-extending ground contacting portion positioned and sized to extend under a load carried by said frame, hook means to engage the upper portion of the load, and a pivotable wheel assembly depending from said frame and carrying a pair of transversely-spaced wheels, said wheel assembly being pivotally mounted adjacent its top end to said body frame above the lower portion thereof and being freely suspended for pivoting movement between an extended position in which said wheels are spaced rearwardly from said frame and located above the ground surface, and a forward position in which the wheel assembly is in abutment with the frame and the wheels are adjacent said ground-contacting portion, said wheel assembly having a transverse foot rest positioned to be engaged and depressed by the foot of the operator when said body frame is upright, whereby said wheel assembly may be propelled forcibly forward into striking engagement with the frame with sufficient impact to cause said ground contacting portion to slide on the ground surface and under the load held by said hook means.

2. A hand truck comprising a body frame adapted to stand in an upright position and having a forwardly-inclined lower portion carrying a pair of transversely-spaced spur members fixed to the bottom thereof and positioned to rest upon said ground surface and to extend under a load carried by said frame, a vertically adjustable chime hook for engaging and holding the upper portion of the load, and a pivotable wheel assembly depending from said frame and carrying a pair of transversely-spaced wheels, said wheel assembly being pivotally mounted adjacent its top end to said frame above the lower portion thereof and being freely suspended for pivoting movement between an extended position in which said wheels are spaced rearwardly from said frame lower portion and a forward position in which the lower end of said wheel assembly is in abutment with the frame lower portion and the wheels are adjacent said spur members, said wheel assembly having a transverse foot rest positioned to be engaged and depressed by the foot of the operator when said body frame is upright, whereby said wheel assembly may be propelled forcibly forward into striking engagement with the frame lower portion with sufficient impact to cause said spur members to slide on the ground surface and under the load held by said hook means.

3. A hand truck comprising a body frame adapted to stand in an upright position upon a ground surface, and a wheel assembly pivotally mounted on said frame, said frame comprising a pair of laterally spaced and alined identical frame bars each having a central portion disposed substantially vertically when said frame is in its upright position, an integral upper portion inclined rearwardly from said central portion, and an integral lower portion inclined forwardly from said central portion, said lower frame bar portions each having at its bottom end a depending spur member which projects forwardly therefrom and positioned to contact the ground surface in the upright position of said frame, each of said frame bars also having an extension plate extending rearwardly from said lower frame bar portion, said wheel assembly comprising a pair of laterally spaced wheel plates joined at their top ends by a foot plate, and a pair of wheels rotatably respectively mounted at the bottoms of said wheel plates and connected by an axle, said wheel plates being respectively pivotally connected at their top forward ends to said extension plates for movement between a rearward position in which said axle is located rearwardly of the frame bar central portions to a forward position in which said axle is located forwardly of said frame central portion, the wheels in said rearward position being spaced from said spur members a sufficient distance to support the upright frame on a base formed by said wheels and said spur members, the wheels in said forward position being located proximate to said spur members in a position to contact the ground surface in the upright position of said frame, said axle abutting the rear surface of said extension plates when the wheel assembly is in its forward position, a portion of said foot plate extending rearwardly of said extension plates in the rearward position of said wheel assembly and being substantially horizontally disposed, said foot plate being located rearwardly of the pivotal mount of said wheel assembly, whereby said wheel assembly will be pivoted to its forward position, said wheel assembly being heavy enough to cause said axle to strike said extension plates with sufficient force to propel the lower end of said body frame forwardly with the spur member sliding along said ground surface.

4. A hand truck according to claim 3 in which a spring is mounted for coaction with said extension plates and wheel assembly to urge the latter to its rearward position.

5. A hand truck according to claim 3 in which said frame has a pair of spaced, longitudinally-extending central bars located between said frame bars, and a chime hook assembly, said chime hook assembly comprising a bracket mounted for longitudinal sliding movement on said central bars, and a chime hook having an elongated shaft, said bracket having a downwardly and forwardly inclined bottom wall communicating with a bracket opening which is alined with the space between said central bars, said chime hook shaft being transversely slidable through said bracket opening and normally resting upon said inclined bottom wall in the upright position of said frame, and extending through said opening and the space between said central bars, said opening, said shaft, and said bracket bottom wall being relatively dimensioned to cause said shaft to frictionally engage said bottom wall and the bracket at the top of said opening, when the front of said shaft is pivoted upwardly, said chime hook being located at the front of said shaft.

6. A hand truck comprising a body frame adapted to stand in an upright position upon a ground surface, and a wheel assembly pivotally mounted on said frame, said frame having a central portion disposed substantially vertically when said frame is in its upright position, an integral upper portion inclined rearwardly from said central portion, and an integral lower portion inclined forwardly from said central portion, said lower portion having a pair of spaced spur members which project forwardly thereof and depend therefrom in a position to contact the ground surface in the upright position of said frame, said frame also having a rearwardly-extending frame extension, said wheel assembly comprising a mounting bracket and a pair of transversely spaced-apart wheels rotatably mounted on said bracket and projecting therebelow, said bracket being pivotally mounted at its top end to said frame extension for movement between a rearward position in which the wheel axes are located rearwardly of the frame central portion, and a forward position in which the wheel axes are located forwardly of the frame central portion, the wheels in said rearward position being spaced from said spur members a sufficient distance to support the upright frame on a base formed by said wheels and said spur members, said wheels in said forward position being also in ground-contacting position proximate to said spur members, a portion of said wheel assembly abutting a lower portion of said frame extension in the forward position of said wheel assembly, a portion of the wheel assembly in its rearward position extending laterally rearward of said frame extension, said wheel assembly and said frame extension having cooperating stop means which engage in the rearward position of said wheel assembly to prevent further rearward pivoting thereof, said frame being also adapted to assume a reclining position with the central frame portion disposed substantially horizontally and the top end of the frame and a laterally-projecting wheel assembly portion contacting the ground surface, the weight of said frame upon said wheel assembly portion urging said wheel assembly to its forward position whereby said wheels are raised above said ground surface.

7. A hand truck comprising a body frame adapted to stand in an upright position upon a ground surface, and a wheel assembly pivotally mounted on said frame, said frame having a central portion disposed substantially vertically when said frame is in its upright position, an integral upper portion inclined rearwardly from said central portion, and an integral lower portion inclined forwardly from said central portion, said lower portion having a pair of spaced spur members which project forwardly thereof and depend therefrom in a position to contact the ground surface in the upright position of said frame, said frame also having a rearwardly-extending frame extension, said wheel assembly comprising a mounting bracket and a pair of transversely spaced-apart wheels rotatably mounted on said bracket and projecting therebelow, said bracket being pivotally mounted at its top end to said frame extension for movement between a rearward position in which the wheel axes are located rearwardly of the frame central portion, and a forward position in which the wheel axes are located forwardly of the frame central portion, the wheels in said rearward position being spaced from said spur members a sufficient distance to support the upright frame on a base formed by said wheels and said spur members, said wheels in said forward position being also in ground-contacting position proximate to said spur members, a portion of said wheel assembly abutting a lower portion of said frame extension in the forward position of said wheel assembly, a portion of the wheel assembly in its rearward position extending laterally rearward of said frame extension, said wheel assembly and said frame extension having cooperating stop means which engage in the rearward position of said wheel assembly to prevent further rearward pivoting thereof, said frame being also adapted to assume a reclining position with the central frame portion disposed substantially horizontally and the top end of the frame and a laterally-projecting wheel assembly portion contacting the ground surface, the weight of said frame upon said wheel assembly portion urging said wheel assembly to its forward position whereby said wheels are raised above said ground surface, said frame having a bracket at each side of its lower end and a stake having a laterally-projecting top arm mounted in each bracket, each said stake being adjustable in said bracket to a position in which said lateral arm is directed rearwardly of the frame and to a position in which the lateral arm projects forwardly of said frame, each stake being of sufficient length to contact the ground surface in said latter position when the hand truck is upright.

8. A hand truck comprising a body frame adapted to stand in an upright position upon a ground surface, and a wheel assembly pivotally mounted on said frame, said frame comprising a pair of laterally spaced and alined identical frame bars each having a central portion disposed substantially vertically when said frame is in its upright position, an integral upper portion inclined rearwardly from said central portion, and an integral lower portion inclined forwardly from said central portion, said lower frame bar portions each having at its bottom end a depending spur member which projects forwardly therefrom and positioned to contact the ground surface in the upright position of said frame, each of said frame bars also having an extension plate extending rearwardly from said lower frame bar portion, said wheel assembly comprising a pair of laterally spaced wheel plates joined at their top ends by a foot plate, and a pair of wheels rotatably respectively mounted at the bottoms of said wheel plates and connected by an axle, said wheel plates being respectively pivotally connected at their top forward ends to said extension plates for movement between a rearward position in which said axle is located rearwardly of the frame bar central portions to a forward position in which said axle is located forwardly of said central frame portion, the wheels in said rearward position being spaced from said spur members a sufficient distance to support the upright frame on a base formed by said wheels and said spur members, the wheels in said forward position being located proximate to said spur members in a position to contact the ground surface in the upright position of said frame, said axle abutting the rear surface of said extension plates when the wheel assembly is in its forward position, a portion of said foot plate extending rearwardly of said extension plates in the rearward position of said wheel assembly and being substantially horizontally disposed, and a box hook having a planar elongated shaft and a lateral hook at one end of said shaft, said box hook shaft having a plurality of transverse cross pins secured in spaced relation to each other, each of said cross pins being of greater length than the width of said space between the central bars.

9. A hand truck for lifting and transporting a heavy load resting on the ground surface, said hand truck comprising a frame having a transverse spur at the bottom thereof and load-retaining means at the upper end thereof, said frame being adapted to be positioned in an upright position with its longitudinal axis extending vertically and with said spur resting upon the ground adjacent the base of a load, said retaining means being then adjustable to engage and retain the top of said load, a wheel assembly pivotally attached to the lower end of said frame and extending transversely rearwardly therefrom, said assembly carrying a pair of spaced wheels at the bottom end thereof, said assembly in the upright position of said frame having a normal extended position in which it hangs freely with the bottom end thereof remote from said frame and elevated above the ground, said assembly being movable to a retracted position in which the bottom end thereof is in contact with said frame.

10. A hand truck for lifting and transporting a heavy load resting on the ground, said hand truck comprising a frame having a transverse spur at the bottom thereof and an adjustable chime hook mounted thereon above said spur, said frame being adapted to be positioned in an upright position with its longitudinal axis extending vertically and with said spur resting upon the ground adjacent the base of a load, said chime hook being then adjustable to engage and retain the top of said load, a wheel assembly pivotally attached at its upper end to the lower end of said frame and extending transversely rearwardly therefrom, said assembly carrying a pair of spaced wheels at the bottom end thereof, said assembly in the upright position of said frame having a normal extended position in which it hangs freely with the bottom end thereof spaced from said frame and elevated above the ground, said assembly being movable to a retracted position in which the bottom end thereof is in contact with said frame, said wheel assembly also having a transverse foot rest positioned to be engaged and depressed by the foot of the operator when said body frame is upright, whereby said wheel assembly may be propelled, forcibly forward into striking engagement with the frame with sufficient impact to cause said spur to slide on the ground surface and under the load held by said hook means.

11. A hand truck according to claim 10 which also includes spring means to bias said wheel assembly to its extended position.

References Cited in the file of this patent

UNITED STATES PATENTS

| | | |
|---|---|---|
| 1,513,863 | Sabin | Nov. 4, 1924 |
| 1,815,825 | Bates | July 21, 1931 |
| 1,965,943 | Lea | July 10, 1934 |
| 2,096,994 | Millen | Oct. 26, 1937 |
| 2,346,649 | Bilek et al. | Apr. 18, 1944 |
| 2,485,085 | Burch | Oct. 18, 1949 |

FOREIGN PATENTS

| | | |
|---|---|---|
| 673,194 | France | Oct. 7, 1929 |
| 708,921 | France | May 5, 1931 |
| 398,441 | Great Britain | Sept. 14, 1933 |